July 17, 1928.

W. J. NOONAN

ELECTRIC ROASTER

Filed Feb. 12, 1927     5 Sheets-Sheet 1

1,677,651

INVENTOR=
William J. Noonan
by Macleod, Calver, Copeland & Dike
ATTORNEYS

July 17, 1928.
W. J. NOONAN
ELECTRIC ROASTER
Filed Feb. 12, 1927
1,677,651
5 Sheets-Sheet 2
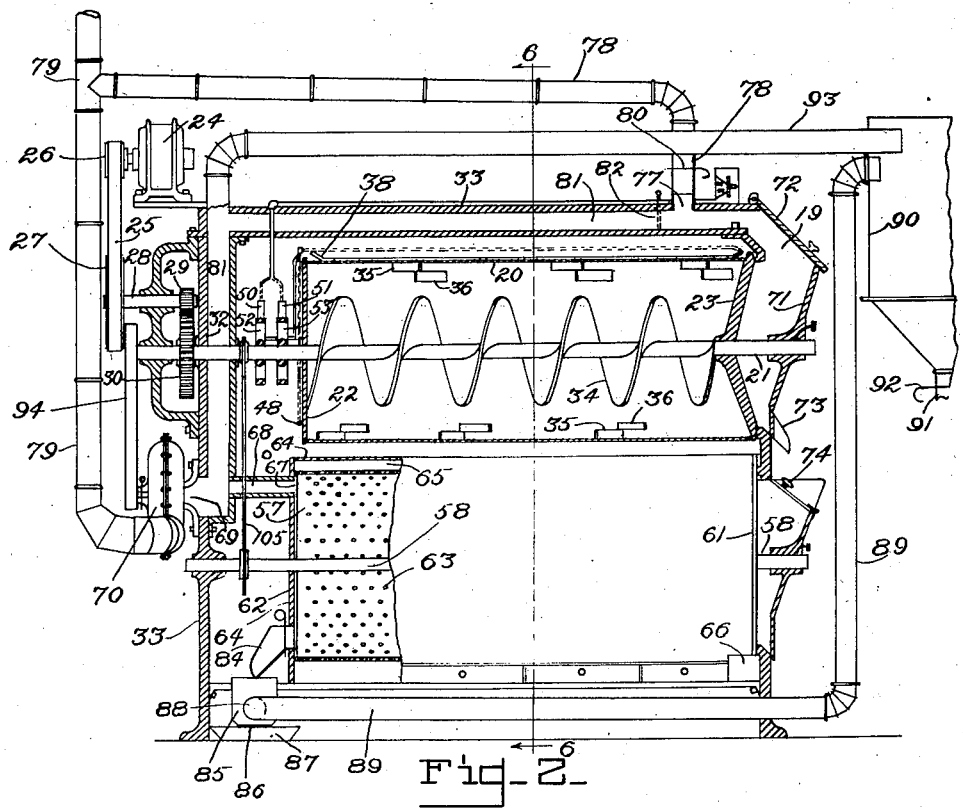
INVENTOR=
William J. Noonan
by Macleod, Calver, Copeland & Dike
ATTORNEYS July 17, 1928.

W. J. NOONAN

ELECTRIC ROASTER

Filed Feb. 12, 1927

INVENTOR:
William J. Noonan
By Macleod, Calver, Copeland & Diehl
ATTORNEYS.

July 17, 1928.                                                    1,677,651
W. J. NOONAN
ELECTRIC ROASTER
Filed Feb. 12, 1927                          5 Sheets-Sheet 4
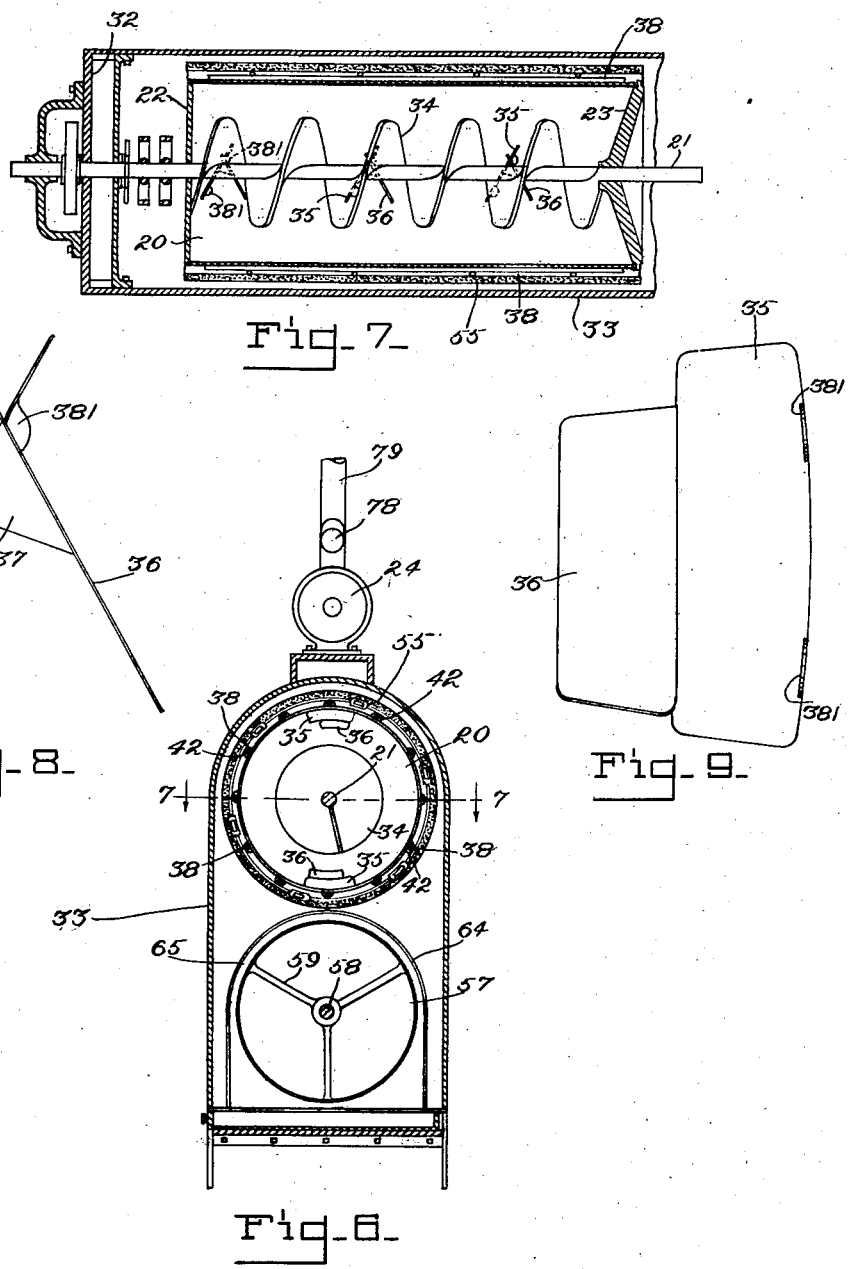

July 17, 1928.
W. J. NOONAN
ELECTRIC ROASTER
Filed Feb. 12, 1927
5 Sheets-Sheet 5
1,677,651
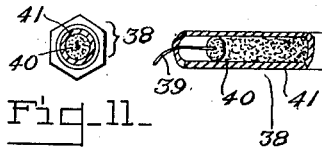
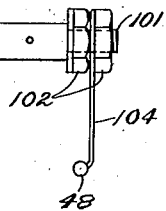
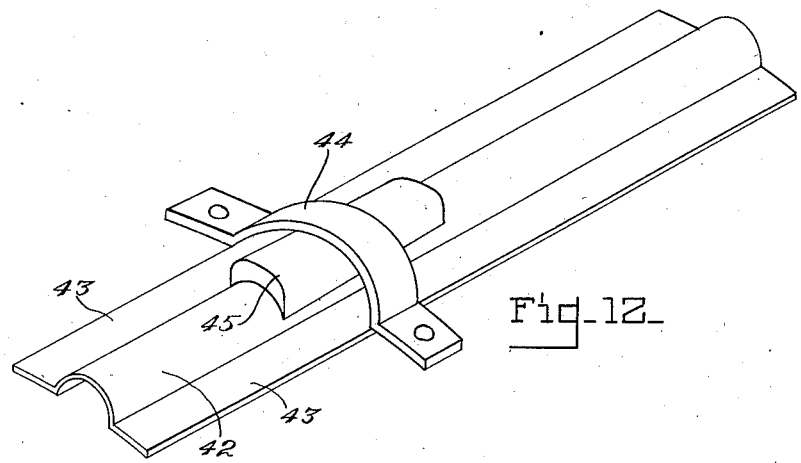
INVENTOR=
William J. Noonan
by Macleod, Calver, Copeland & Dike
ATTORNEYS.

Patented July 17, 1928.

1,677,651

UNITED STATES PATENT OFFICE.

WILLIAM J. NOONAN, OF MANSFIELD, MASSACHUSETTS.

ELECTRIC ROASTER.

Application filed February 12, 1927. Serial No. 167,719.

The invention relates to an improvement in electric roasters and especially roasters having a rotary drum or shell provided with electrical heating elements. It is more particularly intended for use in roasting beans, such as cocoa beans, coffee, peanuts or the like but the invention may be employed in connection with a roasting apparatus for any purpose for which it is adapted.

One feature of the invention relates to the roasting drum. Another feature relates to the heating elements and their combination with the roasting drum. Another feature relates to devices for agitating the material within the drum. Another feature relates to the cooling drum into which the material is discharged from the roasting drum. Another feature relates to means and methods for introducing fresh air into the cooling drum. Another feature relates to means and method for discharging the vapors and smoke from the roasting drum. Another feature relates to means for separating from the roasted material, foreign matter, such as small stones, pieces of metal or other substances heavier than the roasted material. Another feature relates to the means and method of conveying the roasted product to a place of discharge. Other features of the invention will be referred to hereinafter and more particularly described in the claims.

The invention will be fully understood from the following description when taken in connection with the accompanying drawings and the novel features thereof will be pointed out and clearly defined in the claims at the close of this specification.

In the drawings:

Fig. 2 is a side elevation partly broken away and partly in section of a larger size apparatus having this discharge outlet from the cooling cylinder at the rear end and equipped with suction means for separating the beans from heavier foreign substances.

Fig. 4 is a perspective view of the roasting drum having the heating elements and clamps assembled therewith and before the drum is enclosed in the outside asbestos covering.

Fig. 6 is a vertical section on line 6—6, of Fig. 2.

Fig. 7 is a longitudinal sectional view of the roasting drum.

Fig. 8 is a detailed side view, and

Fig. 9 is a detailed end view on an enlarged scale of one of the deflector elements secured to the inner periphery of the roasting drum to agitate the material being roasted during rotation of the drum.

Fig. 10 is a view partly in section and broken away at one end of one of the heating elements detached.

Fig. 11 is a transverse section of Fig. 10.

Fig. 12 is a perspective view showing on an enlarged scale the clamping elements to be used to secure one of the heating elements to the roasting drum.

Figure 1:
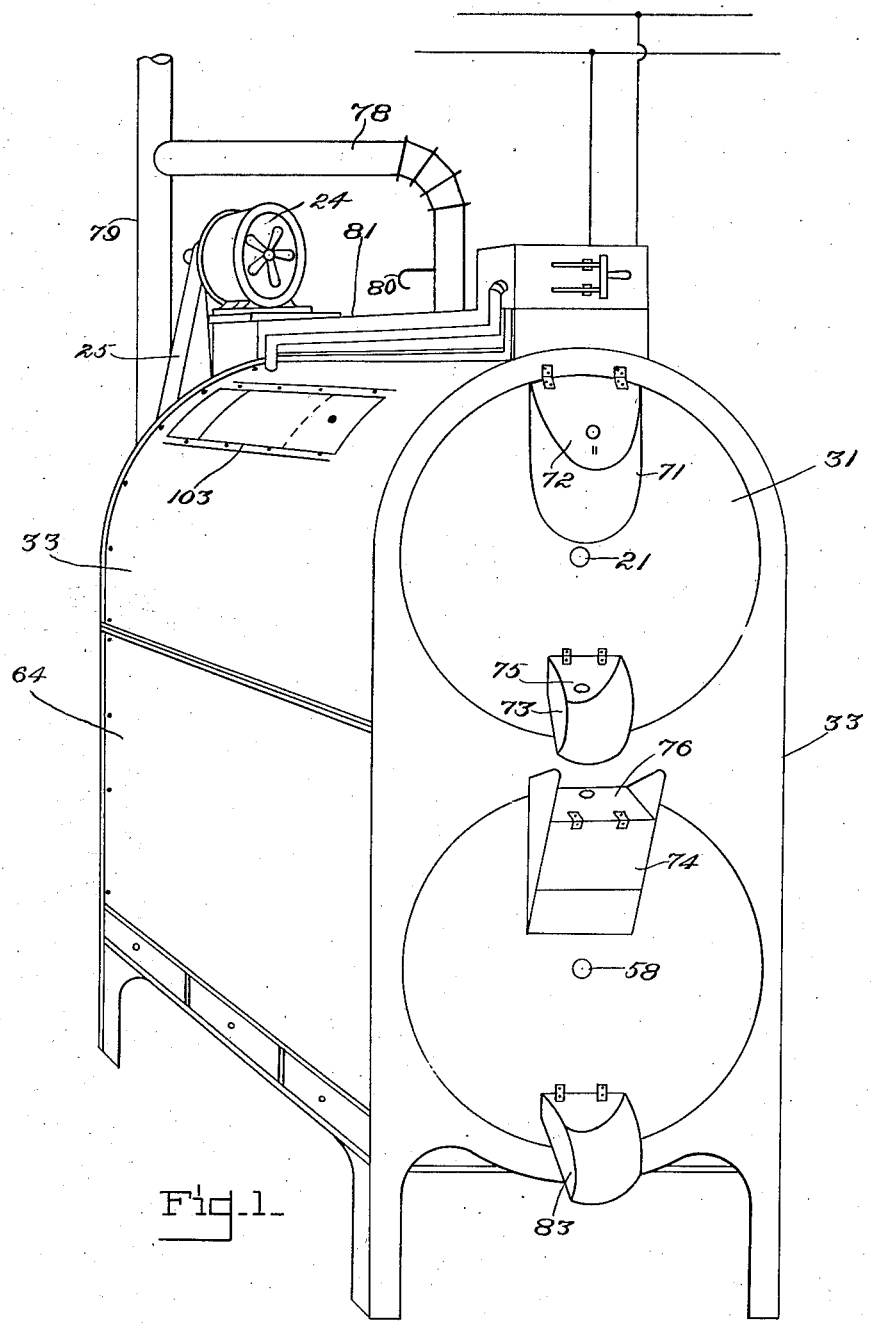
Fig. 1 is a perspective view of an apparatus of relatively small size embodying the invention, showing a discharge outlet for the roasted beans from the front end of the cooling cylinder.
Figure 5:
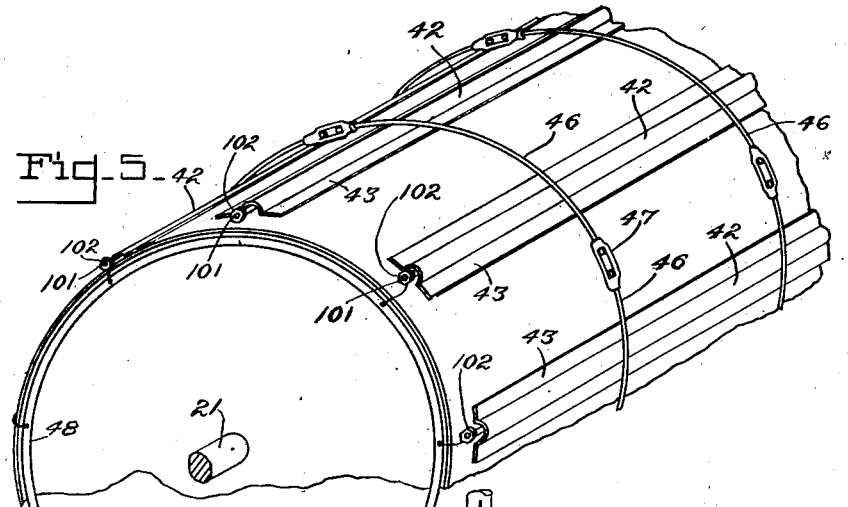
Fig. 5 is an enlarged fragmentary view of the roasting drum shown in Fig. 4 and shows more clearly the clamping mechanism for the heating elements, and the electrical connection of the bus ring with the heating elements.

Referring to the drawings:

There is shown at 20 a rotary roasting cylinder or shell comprising a cylindrical drum, preferably of steel, mounted fast on a rotary shaft 21. One end of the cylinder has a solid head 22 making a tight closure therefor, and the other end of the cylinder has a head 23, preferably of skeleton form or open work, somewhat like the spokes of a wheel. The shaft 21 passes centrally through the two heads and is made fast thereto in such manner that the drum rotates with the shaft. The shaft is journalled in the end walls 31, 32 of the casing 33. The shaft may be rotated by any suitable means. As shown, it is driven by a motor 24 through a belt 25 running over a pulley 26 on the motor shaft, a pulley 27 on the stud shaft 28 and by pinion 29 on said stud shaft which meshes with gear 30 on the shaft 21. Any other suitable driving means may be employed.

For convenience the right hand end of the machine as viewed in Fig. 2 will be referred to as the front end. Mounted on the shaft 21 are a series of blades 34 having somewhat the appearance of a worm, said blades having a pitch inclined to the axis in such manner that when the shaft rotates clockwise as viewed from the front or right-hand end of Fig. 2, the said blades will agitate the portion of the contents of the drum with which they come in contact and feed them toward the rear end. On the inner periphery of the cylinder are secured a plurality of deflectors each comprising two blades 35, 36 disposed endwise to each other in diverging relation to each other. They are secured together at their edges by a web 37 so that viewed in side elevation as in Figs. 7 and 8, the combined pair of blades form a somewhat V-shaped deflector. The blade 35 is preferably somewhat longer than the blade 36. The blade 35 is formed with ears 381 secured to the inner periphery of the cylinder 20 by solder or other suitable means.

While the drum rotates, if it is sufficiently full of beans for the blades 34 on the shaft 21 to dip into them, the blades will agitate the beans and tend to feed toward the rear end such beans as come within the sweep of the blades. The deflector blades 35, 36 mounted on the inner periphery agitate the beans which come within their range. The blade 35 acts on the beans nearer the periphery and the blade 36 being offset from the blade 35, acts on the beans further away from the periphery. By setting the blades 35 and 36 at diverging angles to each other they agitate the beans more effectually than if they were parallel to each other. The offset blades 36 tend to push the beans toward the left or rear end and the blades 35 tend to push the beans toward the front end for discharge into the cooling shell. Preferably there are at least two rows of the said deflectors diametrically opposite each other as shown in Fig. 2. More than two rows may be employed if desired. If two rows are employed those in one row should be in staggered relation to those in the other row, as shown in Fig. 2, for more effectual agitation.

On the outer periphery of the cylinder and disposed longitudially thereof are the heating elements 38. These heating elements comprise electric wires 39 enclosed in a covering 40 of material which preferably is of such a character as to insulate the wire against leakage of the electric current yet is a good conductor of heat.

The wire with its insulating casing is enclosed in a metal tube 41 which is a good conductor of heat.

A plurality of said heating elements are laid lengthwise on the outer periphery of the steel cylinder 20 parallel with each other and are held in spaced relation to each other by holders having a semi-cylindrical intermediate portion 42 to cover the heating element and side flanges 43, 43 which rest on the outer periphery of the cylinder 20. (See Fig. 12). In order to render the heating elements accessible for repair or for replacement, the said holders 42 are held in place by clamps instead of being permanently attached.

For this purpose cross-over bands 44 are provided which are secured to the periphery of the cylinder by rivets or screws or other suitable means, the cross-over portion having a slight clearance above the top of the semi-cylindrical portion 42 of the holder. A wedge 45 is inserted under the band 44, being arched in cross section to fit over the semi-cylindrical portion 42 of the holder and to fit under the arched cross-over 44. The wedge will bind the holder 42 against axial displacement, and the bands 44 will prevent lateral displacement. Whenever it is desired to remove or replace one of the heating elements, the wedges 45 can be knocked out, and the holder 42 may then be loosened sufficiently to permit the heating element to be drawn out axially.

In order to still further hold the heating elements in firm heating contact with the cylinder 20, hoops 46 are provided at intervals which encircle the entire cylinder. These hoops are preferably made in sections whose adjacent ends are connected by turnbuckles 47 whereby the hooks may be loosened or tightened up as desired. These hoops are intended to hold the heating elements in contact with the surface of the cylinder so as to heat the cylinder, but should not clamp them tight enough to prevent axial movement under expansion and contraction. The proper tension can be regulated by the turnbuckles.

It is preferabe to have the heating elements clamped to the cylinder only at the middle and, therefore, the cross-over members 44 and wedges 45 are placed midway of the length of the heating elements for the following reasons:

When heat is first applied to the heating elements they will expand much more rapidly than the cylinder itself and if provision is not made for this rapid and unequal expansion the heating elements will buckle. This buckling would have a tendency to create or promote a short or broken circuit. Also it will raise the heating element out of contact with the cylinder thereby lessening the heat conductivity from the heating element to the cylinder. It is, therefore, preferable to have the heating elements held firmly at the middle so that when heat is applied and the heating elements start to creep lengthwise due to expansion, they will be held fast at the middle and the creeping movement will be from the center toward both ends of the cylinder. The clamps hold the heating elements quite securely to the cylinder, sufficiently so to make a good contact for conducting the heat and yet they will not obstruct the expansion of the heating elements as the clamps are in a position to ride back and forth with the heating elements as the expansion and contraction take place.

The wires 39 of the heating elements are electrically connected at their ends with terminals 101 having electrical connection by wire 104 and binding nuts 102 with bus rings 48 to take electric current from the brushes 50, 51 through the collector rings 52, 53. The particular method by which the heat elements are electrified is however immaterial.

The roasting cylinder or drum together with its heating elements have an outer covering 55 of asbestos or other non-conducting material of sufficient thickness to prevent the escape of heat.

Mounted beneath the roasting drum there is a rotary cooling drum 57, into which the hot roasted beans are discharged from the roasting drum. The cooling drum is mounted fast on a rotary shaft 58 driven by shaft 21 through a belt 105 and pulleys on said shafts (see Fig. 2) or by other suitable means. It has a skeleton head 59 at each end made fast to the shaft so that the cooling drum will rotate with the shaft. There are stationary heads 61, 62 set close to the opposite ends of the cooling drum, separate therefrom, but having sufficient clearance not to interfere with the rotation of the drum.

The peripheral wall of said drum is formed with a large number of small perforations 63 for the admission of air for cooling. The drum is enclosed in a stationary steel jacket 64. There is a space 65 between the cooling drum and the jacket.

There is an opening 66 in the lower side of said fixed jacket 64 near the front stationary head 61 through which outside air may be sucked into the space 65 and thence through the small apertures 63, and an outlet opening 67 through the opposite stationary head 62, said outlet 67 having communication by a pipe 68 and passage 69 with a blower 70. By means of the blower air is sucked in through the opening 66 in the jacket 64, thence through the space 65 and the apertures 63 into the interior of the cooling drum and out through 67, 68 and 69 to the blower. Thus a circulation of air is produced into and through the interior and around the outside of the cooling drum.

Figure 3:
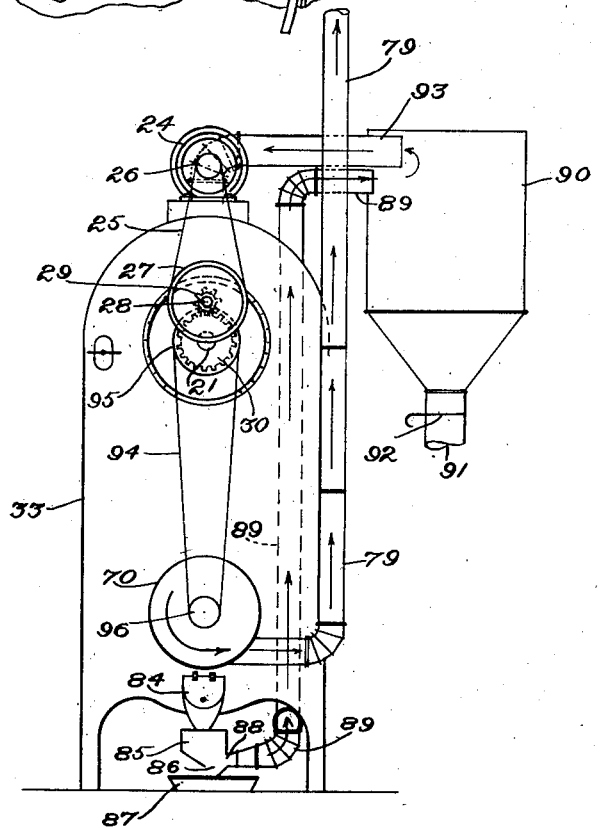
Fig. 3 is a rear end view of the apparatus shown in Fig. 2, viewed from the left of Fig. 2.

The shaft 58 and inner periphery of the cooling drum are respectively provided with agitator blades similar to those on the shaft 21 and periphery of the roasting drum. It is not deemed necessary to show them specially. If the beans are to be discharged at the front end as shown in Fig. 1, the agitator blade 35, 36 will be arranged as shown in the roasting shell. If the discharge outlet is at the rear end as shown in Figs. 2 and 3, the blades will be arranged so that the blades 36 will move the beans toward the front and the blades 35 nearer the periphery will move the beans back toward the outlet.

A feed hopper 71 inserted in the casing has a hinged door 72 and affords admission of the beans to the upper part of the roasting drum. The door 72 should be kept closed during the roasting of the beans. A discharge chute 73 through the casing communicates with the roasting drum at the lowest point of its rotation to permit discharge of the roasted beans into a hopper 74 communicating with the cooling drum. The chute 73 and hopper 74 are provided with hinged doors 75, 76, respectively. The door 75 of the discharge chute 73 from the rotating drum should be kept closed during the roasting and the door 76 of the hopper 74 of the cooling drum should be kept closed during the cooling.

When the beans in the roasting drum have been sufficiently roasted the doors of the discharge chute 73 and of hopper 74 will be opened. The operation of the peripheral deflector blades 35, 36 will cause the gradual discharge of the contents of the roasting drum into the discharge chute 73 and thence they will pass into the cooling drum.

There is usually more or less steam formed in the roasting drum during the roasting operation due to the moisture in the beans. It is important that such steam be allowed to escape, otherwise it will have a deleterious effect on the beans. For this purpose there is provided a steam outlet 77 through the top of the outer casing. The steam will escape from the roasting drum through the openings in the right hand skeleton head 23 and pass into the space 19 between the head 23 and the wall 71 of the casing, thence to the outlet 77. A pipe 78 carries the steam to a pipe 79 which communicates with the outlet from the blower 70. The pipe 78 may, however, discharge directly into the outer air. The pipe 78 is provided with a damper 80 which may be closed when desired.

There is also apt to be more or less smoke formed in the roasting drum from the hot beans and this should be carried away, otherwise it will injuriously affect the flavor of the beans. The smoke being heavier than the steam requires some means for drawing it out faster than it would naturally escape by the steam outlet.

There is therefore provided a passage 81 leading from the space 19 at the end of the drum to the passage 69 thence to the blower 70, and the blower will draw the smoke from the roasting drum into and through the passages 81 and 69 into and through the blower 70, thence through the discharge pipe 79.

A damper 82 is provided in the passage 81 whereby the said smoke passage may be regulated as desired.

For small machines, the discharge of the beans from the cooling drum is preferably at the front end as shown in Fig. 1, and may consist of a single discharge chute shown at 83, Fig. 1.

For large machines, the discharge of the beans from the cooling drum is preferably at the rear end as shown at 84, Figs. 2 and 3, and means are provided for separating from the beans any heavy foreign matter such as small stones, pieces of metal or other foreign matter of greater specific gravity than the beans. To this end the beans are discharged through the chute 84 into a chute 85. This chute has an opening 86 at the bottom through which the heavier substances will fall by gravity into a receptacle 87. The said chute 85 has a side outlet 88 with which is connected a tube or pipe 89 which extends upward, preferably outside of the casing, and at its upper end opens into a hopper 90 having a closed top. The hopper 90 has a discharge outlet 91 at its lower end and a damper 92 is provided for closing said outlet 91 at will.

A suction pipe 93 enters the upper part of the hopper 90 and communicates with the passage 81 leading to the blower 70. When the damper 92 is closed, the hopper 90 being always closed at the top, the blower will create a suction upward through the pipe 89 into the hopper 90, thence through the pipe 93 to the blower, thence through the outlet from the blower to the discharge pipe 79.

The force of the suction should be so regulated that it will lift the beans from the hopper 85 into the hopper 90 but not sufficiently strong to prevent them from then falling by gravity into the bottom of the hopper 90. Any dust or other light particles which may be mingled with the beans when they fall from the cooling drum into the hopper 85 will be carried up with the beans by the suction into the hopper 90. The power of the suction should be such that the dust will not fall with the beans to the bottom of the hopper 90 but will be carried into the outlet pipe 93 and discharged through the blower outlet. When the damper 92 is opened the beans will pass through the outlet from the hopper into a suitable receptacle.

The blower 70 is shown as having driving connection with the motor 24 by means of a belt 94 which runs over a pulley 95 on the shaft 21 and pulley 96 on the blower shaft. See Figs. 2 and 3.

A door 103 (Fig. 1) in the upper part of the casing 33 affords access to the roasting drum so that if it is desired to repair or replace any of the heating elements, a portion of the asbestos covering of the cylinder may be cut away to expose a portion of the heating element to be treated and the heating element may then be removed after loosening the clamp and holder as previously described.

What I claim is:

1. A drum having a plurality of electric heating elements mounted on the periphery thereof adapted to heat the drum, a separable covering member for each of said heating elements extending lengthwise thereof and of the drum, each of said covering members consisting of a strip having an arched portion extending longitudinally of the strip to bridge and cover the heating element and having side flanges which engage the periphery of the drum and means for clamping said covering members to the drum, said clamping means being operable to permit removal of said covering members.

2. A drum having a plurality of electrical heating elements mounted on the periphery thereof, removable covering members for said heating elements, means for clamping each heating element fast to the drum at a point midway of its length, and hoops which encircle the drum, heating elements and covering members to hold the heating elements in contact with the drum throughout their length, said hoops having means whereby the tension of the hoops may be adjusted to hold the heating elements in contact with the drum yet permit longitudinal expansion and contraction under change in temperature.

3. A metallic drum having electric heating elements mounted thereon and in electrical contact therewith and individual means for binding each of said heating elements to the drum at a point intermediate the ends of the heating elements, the portions of the heating elements on opposite sides of said binding point being free to move under heat expansion while said heating elements are held against creeping at the binding point.

4. A heating drum made of heat conducting material having a plurality of electric heating elements mounted on its periphery longitudinally thereof and in electrical contact therewith, means for clamping each of the said heating elements to the drum substantially midway of the length of the heating elements to prevent longitudinal movement of the heating elements at the said midway clamping point, and hoops which encircle the drum and all the attached heating elements and bind them sufficiently to hold them in contact with the drum yet permitting longitudinal expansion and contraction on opposite sides of the midway clamp.

5. A rotary cylindrical roasting drum of heat-conducting material having a plurality of heating elements which lie on the outer periphery thereof and extend longitudinally parallel with the axis of the drum, each heating element having an individual covering strip formed with an arched portion which overlies the heating element and has opposite side flanges which engage the periphery of the drum and a short cross-over member which extends transversely over each cover strip for a short portion of the length of the cover strip intermediate the ends of said cover strip and is secured to the drum.

6. A rotary cylindrical roasting drum of heat-conducting material having a plurality of heating elements which lie on the outer periphery thereof and extend longitudinally parallel with the axis of the drum, each heating element having an individual covering strip formed with an arched portion which overlies the heating element and has opposite side flanges which engage the periphery of the drum and a short cross-over member which extends transversely over each cover strip for a short portion of the length of the cover strip intermediate the ends of said cover strip and is secured to the drum, the arch of said cross-over being high enough to leave a clearance space between said cross-over and the top of the cover strip and a movable wedge inserted between the cross-over and the cover strip.

7. A rotary cylindrical roasting drum of heat-conducting material having a plurality of heating elements which lie on the outer periphery thereof and extend longitudinally parallel with the axis of the drum, each heating element having an individual covering strip formed with an arched portion which overlies the heating element and has opposite side flanges which engage the periphery of the drum and a short cross-over member which extends transversely over each cover strip for a short portion of the length of the cover strip intermediate the ends of said cover strip and is secured to the drum, the arch of said cross-over being high enough to leave a clearance space between said cross-over and the top of the cover strip and a movable wedge inserted between the cross-over and the cover strip, the said heating elements being in contact with but unattached to the drum at those portions which are on opposite sides of the cross-over.

In testimony whereof I affix my signature.

WILLIAM J. NOONAN.